No. 855,109. PATENTED MAY 28, 1907.
T. E. LOGAN.
BATH TUB TRAP.
APPLICATION FILED JUNE 13, 1906.
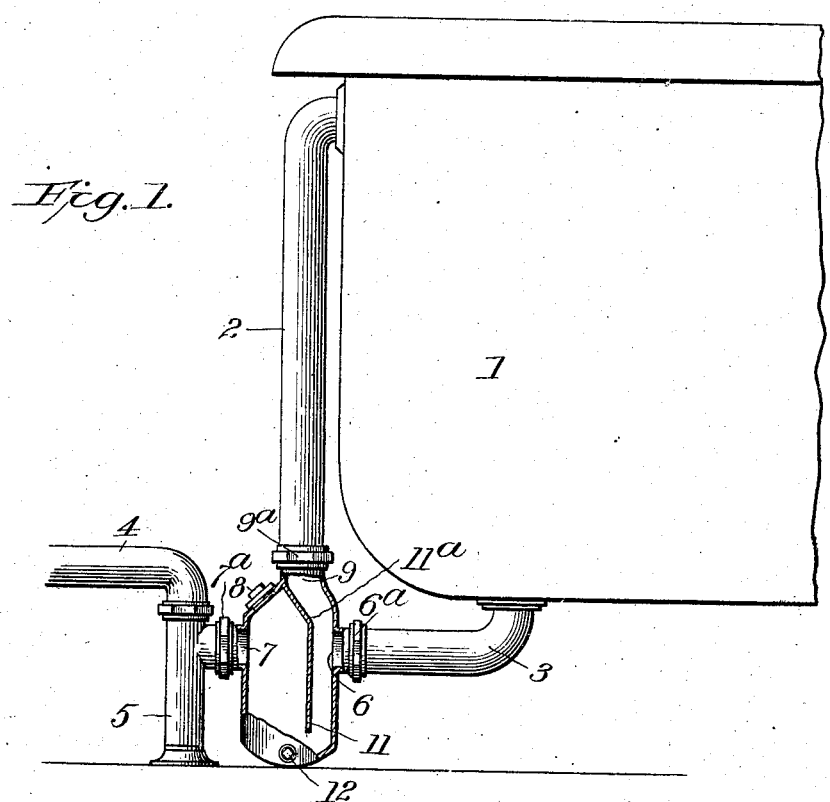
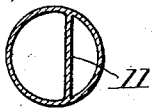
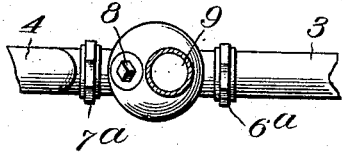
Witnesses
Thomas E. Logan,
Inventor
By
Attorney

UNITED STATES PATENT OFFICE.

THOMAS E. LOGAN, OF SAULT STE. MARIE, MICHIGAN.

BATH-TUB TRAP.

No. 855,109.  Specification of Letters Patent.  Patented May 28, 1907.

Application filed June 13, 1906. Serial No. 321,560.

*To all whom it may concern:*

Be it known that I, THOMAS E. LOGAN, a citizen of the United States, residing at Sault Ste. Marie, in the county of Chippewa and State of Michigan, have invented certain new and useful Improvements in Bath-Tub Traps, of which the following is a specification.

This invention relates to bath tub traps. According to the plumbing regulations of most of the large cities, the greatest part of the plumbing must be within easy reach and not inclosed as by being placed within the floor of a building. These regulations especially apply to traps for bath tubs. However, heretofore, when these bath tub traps have been located above the flooring it has been necessary, owing to desirability of having the bath tub as low as possible, to reduce the depth of the seal, thus reducing its efficiency.

It is therefore an object of my invention to provide a bath tub trap for exposed plumbing in which a greater sealing effect is secured.

Other and further objects will appear in the following description and will be more particularly pointed out in the appended claims.

In the drawings: Figure 1 is a side elevation of one end of a bath tub showing my trap secured thereto, the trap being shown in section. Fig. 2 is a top plan view of the trap, and Fig. 3 is a horizontal section.

Referring more particularly to the drawings 1 indicates the bath tub, 2 the overflow pipe, 3 the bath tub discharge, 4 the vent pipe and 5 the discharge pipe.

The trap comprises a cylindrical body having its lower end closed and resting upon or slightly elevated from the floor of the bath room. The inlet 6, to which the bath tub discharge 3 is connected by union 6ª, is in horizontal alinement with the outlet 7 to which the discharge pipe 5 is connected by union 7ª.

The top of the trap is provided with a removable clean out plug or other closure 8 and with an inlet 9 to which the overflow pipe 3 is connected by union 9ª. Extending downwardly within the trap to a point near the bottom thereof from the top of and at a point between the clean out closure and the overflow inlet, is a partition 11. This partition is provided with a portion 11ª deflected toward the inlet of the trap and located entirely above the said inlet, the remaining portion of the partition being vertical. The purpose of deflecting the partition is to increase the size of the outlet chamber of the trap so that it will be larger than the inlet chamber and thus provide a larger body of air in the outlet chamber so that siphonage cannot take place.

Located in the side of the trap near the bottom on the outlet side is a drain opening which is closed by a removable plug 12.

It will be noted that the vent pipe 4 leads from the upper end of discharge pipe 5 and is thus out of the path of the water discharged from the trap, the tendency to shoot the water into and through the vent pipe being thereby obviated. Further, the unions coupling the piping to the trap are so positioned as to be easily manipulated. Again, the trap may be cleaned without disconnecting any of the parts.

Having thus described my invention, what I claim and desire to secure by Letters Patent is:—

1. As a new article of manufacture, a trap of the class described comprising a body which is closed at its bottom and provided at its top with an over-flow opening, an upright partition depending from the top of the trap at one side of the over-flow opening and deflected toward the opposite side of the trap to divide the latter into a small inlet chamber and a large outlet chamber, the top of the outlet chamber having a clean-out opening, the inlet chamber having an inlet opening in its upright side, and the outlet chamber having an outlet opening in its upright side and at the same level as the inlet opening.

2. The combination with a trap divided into inlet and outlet chambers provided respectively with inlet and outlet openings, the top of the inlet chamber having an over-flow opening, of a waste pipe connected to the inlet opening, an over-flow pipe connected to the over-flow opening, a discharge pipe having an elbowed connection with the outlet opening and extending downwardly therefrom, and a vent pipe connected to the top of the discharge pipe.

In testimony whereof I have signed my name to this specification in the presence of two subscribing witnesses.

THOMAS E. LOGAN.

Witnesses:
  WM. M. SNULL,
  PANSIE HARRISON.